US007281273B2

(12) United States Patent
Strom et al.

(10) Patent No.: US 7,281,273 B2
(45) Date of Patent: Oct. 9, 2007

(54) PROTECTING CONTENT ON MEDIUM FROM UNFETTERED DISTRIBUTION

(75) Inventors: Clifford P. Strom, Redmond, WA (US); Sandeep Sahasrabudhe, Kirkland, WA (US); M. Jay Parks, Kirkland, WA (US); John Paddleford, Renton, WA (US)

(73) Assignee: Microsoft Corporation, Redmond, WA (US)

( * ) Notice: Subject to any disclaimer, the term of this patent is extended or adjusted under 35 U.S.C. 154(b) by 863 days.

(21) Appl. No.: 10/186,003

(22) Filed: Jun. 28, 2002

(65) Prior Publication Data

US 2004/0003274 A1   Jan. 1, 2004

(51) Int. Cl.
  G06F 21/24      (2006.01)
  H04L 9/32       (2006.01)
  G06Q 99/00      (2006.01)
(52) U.S. Cl. ............................ 726/27; 713/176; 705/59
(58) Field of Classification Search ................ 713/156, 713/175, 193; 726/32–33; 380/200–202
See application file for complete search history.

(56) References Cited

U.S. PATENT DOCUMENTS

| 4,827,508 A | 5/1989 | Shear ............................ 380/4 |
| 4,977,594 A | 12/1990 | Shear ............................ 380/4 |
| 5,050,213 A | 9/1991 | Shear ............................ 380/25 |
| 5,204,897 A * | 4/1993 | Wyman ...................... 710/200 |
| 5,260,999 A * | 11/1993 | Wyman ...................... 705/59 |
| 5,410,598 A | 4/1995 | Shear ............................ 380/4 |
| 5,438,508 A * | 8/1995 | Wyman ......................... 705/8 |
| 5,619,731 A * | 4/1997 | Jenkins et al. .............. 711/150 |
| 5,629,980 A | 5/1997 | Stefik et al. .................... 380/4 |
| 5,634,012 A | 5/1997 | Stefik et al. ................ 395/239 |
| 5,638,443 A | 6/1997 | Stefik et al. ................... 380/4 |
| 5,715,403 A | 2/1998 | Stefik .......................... 395/244 |
| 5,757,907 A * | 5/1998 | Cooper et al. ................ 705/52 |
| 5,943,422 A | 8/1999 | Van Wie et al. ................ 380/9 |
| 5,982,891 A | 11/1999 | Ginter et al. .................. 380/4 |
| 6,006,332 A | 12/1999 | Rabne et al. ............... 713/201 |

(Continued)

FOREIGN PATENT DOCUMENTS

EP      0 715 244 A1    6/1996

(Continued)

OTHER PUBLICATIONS

DiChen, "Status of optical disk standards and copy protection technology," *J. Proceedings of the SPIE-The International Society for Optical Engineering*, 2000, 4081, 8-16.

(Continued)

*Primary Examiner*—Christopher Revak
(74) *Attorney, Agent, or Firm*—Woodcock Washburn LLP (57) ABSTRACT

Digital content is encrypted according to a content key (CK) to form (CK(content)) and such (CK(content)), a license generator, a start-up file, and license-generating information are placed on a digital storage medium. The license generator is for generating a digital license corresponding to the placed content, where the generated license has the content key (CK) therein. The start-up file is read and executed when the medium is mounted to a computing device, and the executed start-up file executes the license generator The license generating information includes the content key (CK) and any terms, conditions, rules, and/or requirements to be built into the license.

41 Claims, 7 Drawing Sheets

U.S. PATENT DOCUMENTS

| | | | |
|---|---|---|---|
| 6,112,181 A | 8/2000 | Shear et al. | 705/1 |
| 6,308,277 B1* | 10/2001 | Vaeth et al. | 726/10 |
| 6,477,649 B2* | 11/2002 | Kambayashi et al. | 726/27 |
| 6,574,609 B1* | 6/2003 | Downs et al. | 705/50 |
| 6,611,812 B2* | 8/2003 | Hurtado et al. | 705/26 |
| 7,010,808 B1* | 3/2006 | Leung et al. | 726/26 |
| 7,016,498 B2* | 3/2006 | Peinado et al. | 380/277 |
| 7,024,393 B1* | 4/2006 | Peinado et al. | 705/59 |
| 7,032,113 B2* | 4/2006 | Pendlebury | 713/185 |
| 7,039,615 B1* | 5/2006 | Gajjala et al. | 705/59 |
| 7,051,005 B1* | 5/2006 | Peinado et al. | 705/57 |
| 7,065,507 B2* | 6/2006 | Mohammed et al. | 705/59 |
| 7,073,063 B2* | 7/2006 | Peinado | 713/171 |
| 7,080,043 B2* | 7/2006 | Chase et al. | 705/59 |
| 7,080,410 B2* | 7/2006 | England et al. | 726/32 |
| 7,203,966 B2* | 4/2007 | Abburi et al. | 726/29 |
| 2001/0008016 A1* | 7/2001 | Kotani et al. | 713/193 |
| 2001/0042145 A1* | 11/2001 | Frommer et al. | 710/58 |
| 2001/0053224 A1* | 12/2001 | Kishi et al. | 380/232 |
| 2002/0001277 A1* | 1/2002 | Thomas | 369/59.21 |
| 2002/0165825 A1* | 11/2002 | Matsushima et al. | 705/51 |
| 2003/0046564 A1* | 3/2003 | Masuda et al. | 713/193 |
| 2003/0149670 A1* | 8/2003 | Cronce | 705/59 |
| 2005/0039032 A1* | 2/2005 | Babowicz et al. | 713/193 |
| 2006/0167814 A1* | 7/2006 | Peinado et al. | 705/59 |
| 2006/0167815 A1* | 7/2006 | Peinado et al. | 705/59 |

FOREIGN PATENT DOCUMENTS

| | | |
|---|---|---|
| WO | WO 00/58811 A2 | 10/2000 |
| WO | WO 00/59150 A2 | 10/2000 |
| WO | WO 01/52021 A1 | 7/2001 |

OTHER PUBLICATIONS

Griswold, G.N., "A method for protecting copyright on networks," *IMA Intellectual Property Project Proceedings*, Jan. 1994, 1(1), 169-178.

Kahn, R.E., "Deposit, registration, and recordation in an electronic copyright management system," *IMA Intellectual Property Project Proceedings*, Jan. 1994, 1(1), 111-120.

Murray, W.P., et al., "Review of the existing standards, literature, test development, test results, and caveats concerning compact discs," *J. Proceedings of the SPIE—The International Society for Optical Engineering*, 199, 3806, 132-141.

Nielsen, K.R., "Providing software protection capability for a CD-ROM drive," *J. Hewlett-Packard*, Dec. 1990, 41(6), 49-53.

Parker, D.J., "Standards: Red Book, Yellow Book, Green Book, White-Book-Plaid Book? or, the ROMifications of MPEG," *J. CD-ROM Professional*, 1994, 7(4), 51-53.

Stefik, M., "Trusted systems,," *Scientific American*, Mar. 1997, 78-81.

Stefik, M., "Shifting the possible: how trusted systems and digital property rights challenge us to rethink digital publishing," *Technical Perspective*, 1997, 12, 16 pages.

\* cited by examiner

PROTECTING CONTENT ON MEDIUM FROM UNFETTERED DISTRIBUTION

TECHNICAL FIELD

The present invention relates to preventing distribution of content on a medium by way a computing device. In particular, the present invention relates to a license generator on the medium that is actuated when the medium is to be read and a trust-based system on the computing device that in combination with the license generator copies the content to the computing device in a form requiring a license to render the copied content and generates the license.

BACKGROUND OF THE INVENTION

In a trust-based system on a computing device, access to an entity such as digital content, a computer application, or the like, is restricted based on pre-defined access requirements such as may be embodied in the form of a digital license corresponding to the content. However, not all content available to the computing device is access-restricted by way of the trust-based system.

One particularly well-known example of non-access-restricted content is audio content such as music recorded on a compact disc (CD) according to the well-known CD (Compact Disc) format. Currently, such CD with recorded audio content thereon faces a serious problem in that the content is not encrypted or otherwise protected. Accordingly, practically any user at a computing device having a CD drive and appropriate CD-reading software can read the content and store same in a memory on the computing device.

Moreover, although a typical piece of content is recorded on a CD in a 'Red Book' format that requires about 8 or 9 megabytes of storage space per minute of content, the same content once read can be re-written onto the memory of the computing device in a format the requires about 1 or 1.5 megabytes per minute or even less while still maintaining excellent fidelity. Thus, content such as a popular song can be copied or 'ripped' from a CD and stored on the computing device in a relatively small amount of memory space. More significantly, such song can then be widely distributed in an unfettered manner to other users, perhaps over a network such as the Internet, practically without any limitation.

One method for addressing this problem is to hinder the ability of a computing device to read content in the Red Book format from a CD. However, such a solution leaves a legitimate user without the ability to perform any copying, even when otherwise permitted to do so.

Accordingly, a need exists for a method and mechanism whereby a medium such as a CD or the like is copy-protected so as to prevent unfettered distribution of the content thereon, while still allowing copying of the content to a computing device or the like. In particular, a need exists for a license generator on the CD that requires that the content be copied in a copy-protected format accessible only by way of a corresponding digital license, and that generates the license in combination with a trust-based system on the computing device.

SUMMARY OF THE INVENTION

In the present invention, digital content is encrypted according to a content key (CK) to form (CK(content)) and such (CK(content)) is placed on a digital storage medium. In addition, a license generator, a start-up file, and license-generating information are placed on the medium.

The license generator is for generating a digital license corresponding to the placed content, where the generated license has the content key (CK) therein. The start-up file is read and executed when the medium is mounted to a computing device, and the executed start-up file executes the license generator The license generating information includes the content key (CK) and any terms, conditions, rules, and/or requirements to be built into the license.

To generate a license for the computing device, the medium is mounted to the computing device, and the computing device performs an initial scan to detect the start-up file on the medium and execute the detected start-up file. The start-up file in turn executes the license generator on the medium, and the license generator obtains the license-generating information on the medium including the content key (CK) and any terms, conditions, rules, and/or requirements for rendering the content. The license generator then generates for the computing device a digital license corresponding to the content on the medium. The generated license has the content key (CK) and any terms, conditions, rules, and/or requirements for rendering the content as specified by the obtained license-generating information.

The generated license is placed on the computing device, and the content may be rendered by retrieving the license, determining based on any terms, conditions, rules, and/or requirements in the license whether rendering is permitted, and if rendering is in fact permitted retrieving (CK) from the license, obtaining (CK(content)), applying (CK) to (CK(content)) to result in the content in a decrypted form, and rendering the decrypted content.

BRIEF DESCRIPTION OF THE DRAWINGS

The foregoing summary, as well as the following detailed description of the embodiments of the present invention, will be better understood when read in conjunction with the appended drawings. For the purpose of illustrating the invention, there are shown in the drawings embodiments which are presently preferred. As should be understood, however, the invention is not limited to the precise arrangements and instrumentalities shown. In the drawings.

DETAILED DESCRIPTION OF THE INVENTION

Computer Environment

Figure 1:
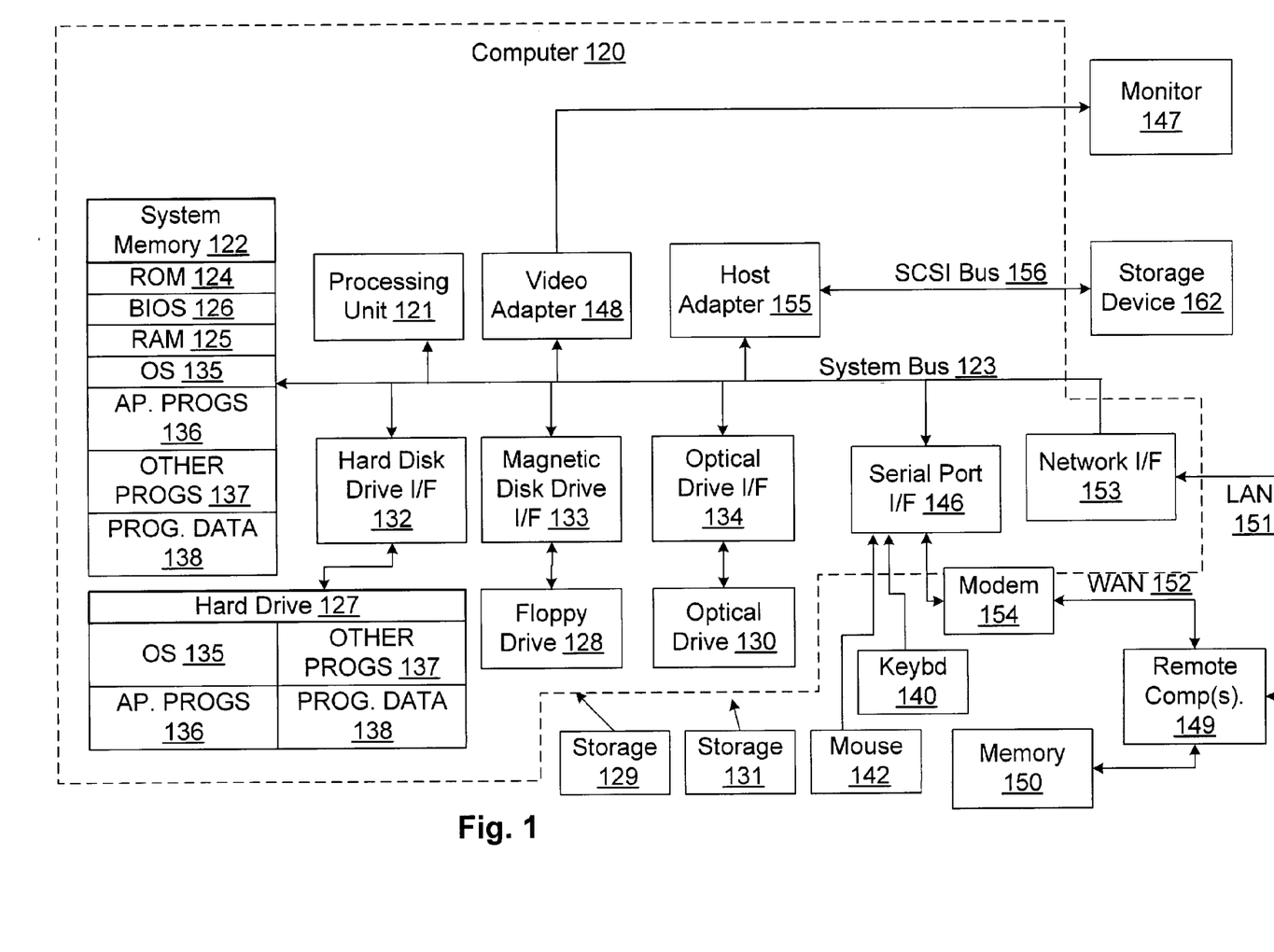
FIG. 1 is a block diagram representing a general purpose computer system in which aspects of the present invention and/or portions thereof may be incorporated.

FIG. 1 and the following discussion are intended to provide a brief general description of a suitable computing environment in which the present invention and/or portions thereof may be implemented. Although not required, the invention is described in the general context of computer-executable instructions, such as program modules, being executed by a computer, such as a client workstation or a server. Generally, program modules include routines, programs, objects, components, data structures and the like that perform particular tasks or implement particular abstract data types. Moreover, it should be appreciated that the invention and/or portions thereof may be practiced with other computer system configurations, including hand-held devices, multi-processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

As shown in FIG. 1, an exemplary general purpose computing system includes a conventional personal computer 120 or the like, including a processing unit 121, a system memory 122, and a system bus 123 that couples various system components including the system memory to the processing unit 121. The system bus 123 may be any of several types of bus structures including a memory bus or memory controller, a peripheral bus, and a local bus using any of a variety of bus architectures. The system memory includes read-only memory (ROM) 124 and random access memory (RAM) 125. A basic input/output system 126 (BIOS), containing the basic routines that help to transfer information between elements within the personal computer 120, such as during start-up, is stored in ROM 124.

The personal computer 120 may further include a hard disk drive 127 for reading from and writing to a hard disk (not shown), a magnetic disk drive 128 for reading from or writing to a removable magnetic disk 129, and an optical disk drive 130 for reading from or writing to a removable optical disk 131 such as a CD-ROM or other optical media. The hard disk drive 127, magnetic disk drive 128, and optical disk drive 130 are connected to the system bus 123 by a hard disk drive interface 132, a magnetic disk drive interface 133, and an optical drive interface 134, respectively. The drives and their associated computer-readable media provide non-volatile storage of computer readable instructions, data structures, program modules and other data for the personal computer 20.

Although the exemplary environment described herein employs a hard disk, a removable magnetic disk 129, and a removable optical disk 131, it should be appreciated that other types of computer readable media which can store data that is accessible by a computer may also be used in the exemplary operating environment. Such other types of media include a magnetic cassette, a flash memory card, a digital video disk, a Bernoulli cartridge, a random access memory (RAM), a read-only memory (ROM), and the like.

A number of program modules may be stored on the hard disk, magnetic disk 129, optical disk 131, ROM 124 or RAM 125, including an operating system 135, one or more application programs 136, other program modules 137 and program data 138. A user may enter commands and information into the personal computer 120 through input devices such as a keyboard 140 and pointing device 142. Other input devices (not shown) may include a microphone, joystick, game pad, satellite disk, scanner, or the like. These and other input devices are often connected to the processing unit 121 through a serial port interface 146 that is coupled to the system bus, but may be connected by other interfaces, such as a parallel port, game port, or universal serial bus (USB). A monitor 147 or other type of display device is also connected to the system bus 123 via an interface, such as a video adapter 148. In addition to the monitor 147, a personal computer typically includes other peripheral output devices (not shown), such as speakers and printers. The exemplary system of FIG. 12 also includes a host adapter 155, a Small Computer System Interface (SCSI) bus 156, and an external storage device 162 connected to the SCSI bus 156.

The personal computer 120 may operate in a networked environment using logical connections to one or more remote computers, such as a remote computer 149. The remote computer 149 may be another personal computer, a server, a router, a network PC, a peer device or other common network node, and typically includes many or all of the elements described above relative to the personal computer 120, although only a memory storage device 150 has been illustrated in FIG. 12. The logical connections depicted in FIG. 12 include a local area network (LAN) 151 and a wide area network (WAN) 152. Such networking environments are commonplace in offices, enterprise-wide computer networks, intranets, and the Internet.

When used in a LAN networking environment, the personal computer 120 is connected to the LAN 151 through a network interface or adapter 153. When used in a WAN networking environment, the personal computer 120 typically includes a modem 154 or other means for establishing communications over the wide area network 152, such as the Internet. The modem 154, which may be internal or external, is connected to the system bus 123 via the serial port interface 146. In a networked environment, program modules depicted relative to the personal computer 120, or portions thereof, may be stored in the remote memory storage device. It will be appreciated that the network connections shown are exemplary and other means of establishing a communications link between the computers may be used.

Trust-Based System

Figure 2:
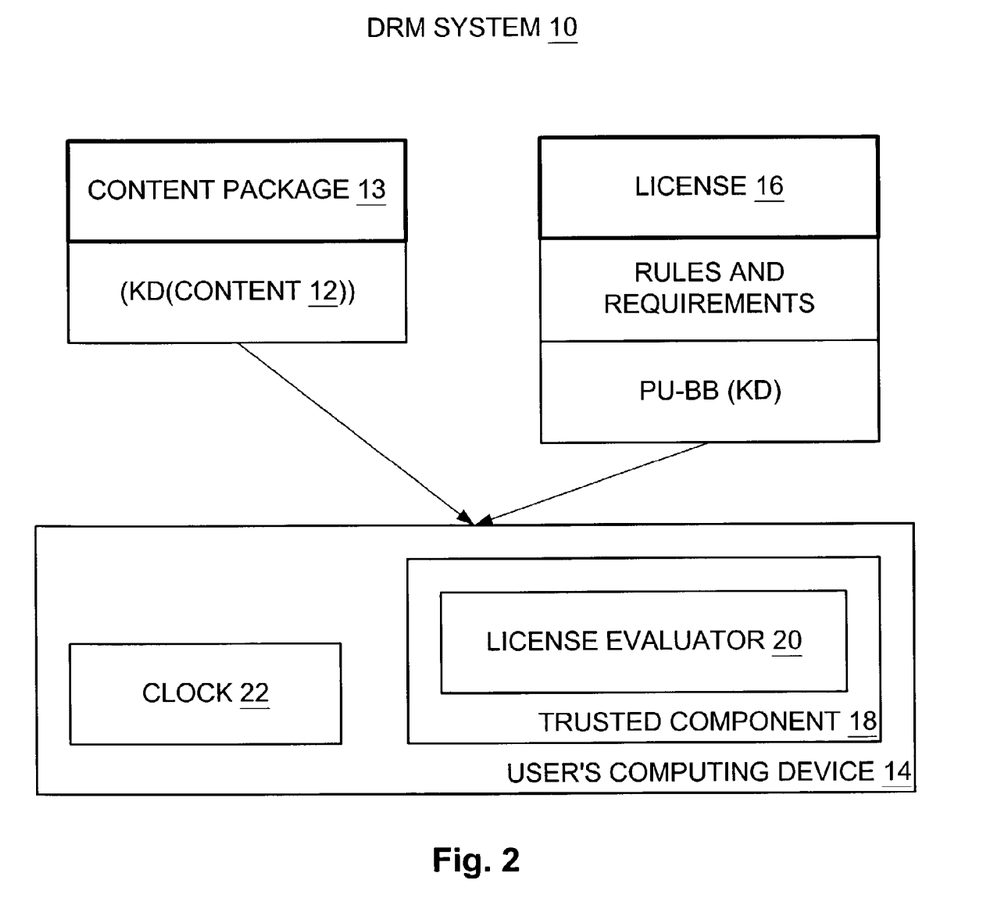
FIG. 2 is a block diagram showing an enforcement architecture of an example of a trust-based system including a computing device having a trusted component thereon.

Many examples of a trust-based system are known or should be apparent to the relevant public. Moreover, the present invention as disclosed herein may be employed with any such trust-based system without departing from the spirit and scope of the present invention. Referring now to FIG. 2, one example of a trust-based system is a digital rights management (DRM) system 10. As is known, such a DRM system 10 is highly desirable in connection with digital content 12 such as digital audio, digital video, digital text, digital data, digital multimedia, etc., where such digital content 12 is to be distributed to users. Upon being received by the user, such user renders or 'plays' the digital content with the aid of an appropriate rendering device such as a media player on a personal computer 14 or the like.

Typically, a content owner distributing such digital content 12 wishes to restrict what the user can do with such distributed digital content 12. For example, the content owner may wish to restrict the user from copying and redistributing such content 12 to a second user, or may wish to allow distributed digital content 12 to be played only a limited number of times, only for a certain total time, only on a certain type of machine, only on a certain type of media player, only by a certain type of user, etc.

However, after distribution has occurred, such content owner has very little if any control over the digital content 12. A DRM system 10, then, allows the controlled rendering or playing of arbitrary forms of digital content 12, where such control is flexible and definable by the content owner of such digital content. Typically, content 12 is distributed to the user in the form of a package 13 by way of any appropriate distribution channel. The digital content package 13 as distributed may include the digital content 12 encrypted with a symmetric encryption/decryption key (KD), (i.e., (KD(CONTENT))), as well as other information identifying the content, how to acquire a license for such content, etc.

The trust-based DRM system 10 allows an owner of digital content 12 to specify license rules that must be satisfied before such digital content 12 is allowed to be rendered on a user's computing device 14. Such license rules can include the aforementioned temporal requirement, and may be embodied within a digital license 16 that the user/user's computing device 14 (hereinafter, such terms are interchangeable unless circumstances require otherwise) must obtain from the content owner or an agent thereof. Such license 16 also includes the decryption key (KD) for decrypting the digital content, perhaps encrypted according to a key decryptable by the user's computing device.

The content owner for a piece of digital content 12 must trust that the user's computing device 14 will abide by the rules and requirements specified by such content owner in the license 16, i.e. that the digital content 12 will not be rendered unless the rules and requirements within the license 16 are satisfied. Preferably, then, the user's computing device 14 is provided with a trusted component or mechanism 18 that will not render the digital content 12 except according to the license rules embodied in the license 16 associated with the digital content 12 and obtained by the user.

The trusted component 18 typically has a license evaluator 20 that determines whether the license 16 is valid, reviews the license rules and requirements in such valid license 16, and determines based on the reviewed license rules and requirements whether the requesting user has the right to render the requested digital content 12 in the manner sought, among other things. As should be understood, the license evaluator 20 is trusted in the DRM system 10 to carry out the wishes of the owner of the digital content 12 according to the rules and requirements in the license 16, and the user should not be able to easily alter such trusted element for any purpose, nefarious or otherwise.

As should be understood, the rules and requirements in the license 16 can specify whether the user has rights to render the digital content 12 based on any of several factors, including who the user is, where the user is located, what type of computing device the user is using, what rendering application is calling the DRM system, and most relevant to the present invention, the date, the time, etc. In addition, the rules and requirements of the license 16 may limit the license 16 to a pre-determined number of plays, or pre-determined play time, for example.

The rules and requirements may be specified in the license 16 according to any appropriate language and syntax. For example, the language may simply specify attributes and values that must be satisfied (DATE must be later than X, e.g.), or may require the performance of functions according to a specified script (IF DATE greater than X, THEN DO . . . , e.g.). If current date and time information is required by a license 16, the computing device 14 should include a clock 22 to be referred to by the trusted component 18.

Upon the license evaluator 20 determining that the license 16 is valid and that the user satisfies the rules and requirements therein, the digital content 12 can then be rendered. In particular, to render the content 12, the decryption key (KD) is obtained from the license 12 and is applied to (KD (CONTENT)) from the content package 13 to result in the actual content 12, and the actual content 12 is then in fact rendered.

Red Book and Yellow Book Data Formats

As is known, the 'Red Book' is a 1980 document that provides standard specifications for the now-ubiquitous compact disc (CD). According to legend, the document was in a binder with red covers, originating the tradition for subsequent adaptations of CD specifications to be referred to as variously colored books. The Red Book described physical specifications for the CD, such as the tracks, sector and block layout, coding, and sampling. The Red Book data format, also referred to as CD-DA (digital audio), defines a content medium for audio data digitized at 44,100 samples per second (44.1 KHz) and in a range of 65,536 possible values (16 bits).

According to Red Book specifications, a standard CD is 120 mm (4.75 inches) in diameter and 1.2 mm (0.05 inches) thick and is composed of a polycarbonate plastic substrate, one or more thin reflective metal (usually aluminum) layers, and a lacquer coating. A CD is divided into a lead-in area, which contains a table of contents (TOC), a program area, which contains the audio data, and a lead-out area, which contains no data. An audio CD can hold up to 74 minutes of recorded sound, and up to 99 separate tracks.

The Red Book specifications form the basis for all later CD technologies

As is also known, the 'Yellow Book' is a 1988 document that is an extension of the Red Book and provides a standard specification for compact disc, read-only-memory (CD-ROM) that enables a CD to contain digital data other than audio data. The Yellow Book data format defines the physical arrangement of the digital data on the disc; other standards are used in conjunction with the Yellow Book to define directory and file structures, although the term 'Yellow Book data format' may be interpreted to incorporate such other standards.

Protecting Content on Medium from Unfettered Copying

The present invention provides a method and mechanism that allows copying or ripping of content 12 on a medium such as a CD, while denying the ability to distribute the copied content 12 in an unfettered manner. Notably, although the present invention is disclose primarily in terms of content 12 on a CD, the content 12 may also be on any other form of computer-readable medium without departing from the spirit and scope of the present invention. In addition, although the present invention is most applicable for use in copying content 12 to a computing device 14 such as a personal computer, the computing device 14 may be any other form of computing device again without departing from the spirit and scope of the present invention.

Figure 3:
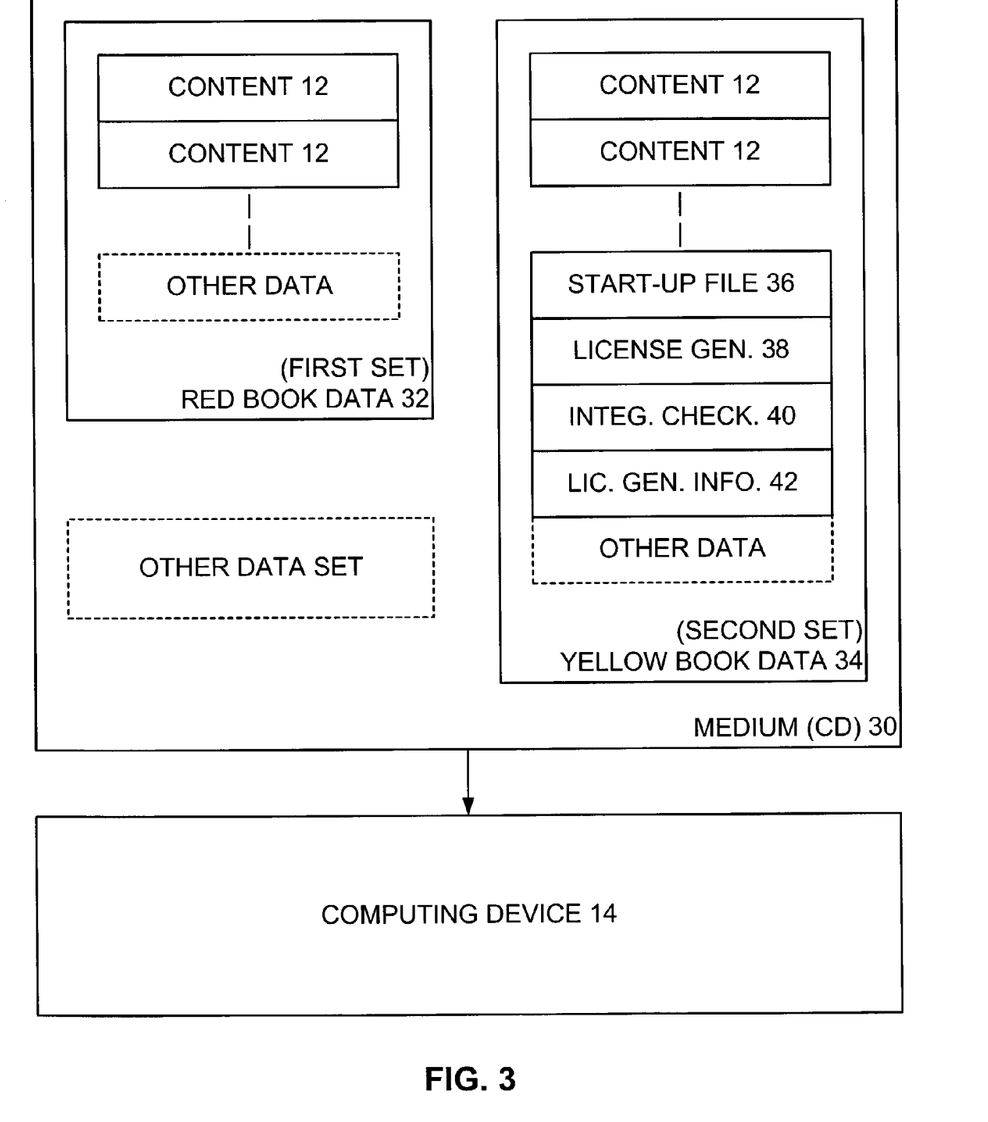
FIG. 3 is a block diagram showing a medium such as a compact disc (CD) for being inserted into the computing device of FIG. 2, in accordance with one embodiment of the present invention.

In the present invention, and referring now to FIG. 3, content 12 is provided on a medium 30 such as a CD in a first data set 32 and a parallel second data set 34. In the case of the CD, the first data set is in the aforementioned Red Book audio data format and the second data set is another form of data such as the aforementioned Yellow Book digital data format. Significantly, the Red Book data/first data set 32 is protected such that the computing device 14 cannot read same. Such protection is known or should be apparent to the relevant public and therefore need not be disclosed herein in any detail. For example, and as is known, the protection may be based on introducing errors which the computing device 14 cannot overcome without significant modification.

Significantly, the CD/medium 30 also includes within the Yellow Book data/second data set 34 a start-up file 36 that is typically automatically read and executed when the CD 30 is inserted into the computing device 14, and a license generator 38 to be instantiated by the start-up file 36 on the computing device 14. As will be set forth in greater detail below, the license generator 38 works with the trusted component 18 on the computing device 14 to issue a license 16 to the computing device 14 for content 12 in the Yellow Book data 34 on the CD 30.

Thus, the computing device 14 can access the Yellow Book data/second data set 34 only, and a device other than the computing device 14 can access the Red Book data/first data set 32. Note that the Red Book data 32 and the Yellow Book data 34 on the medium 30 may substantively duplicate one another or may differ with regard to each other without departing from the spirit and scope of the present invention.

Although the present invention is described in terms of a medium 30 having the first and second data sets 32, 34, the first data set 32 is not ultimately required. Instead, the present invention may be directed solely to the second data set 34 as accessed by a computing device 14 by way of the start-up file 36. Additionally, although the present invention is primarily described in terms of audio content 12, the content 12 may be any type of content without departing from the spirit and scope of the present invention.

Figure 4:
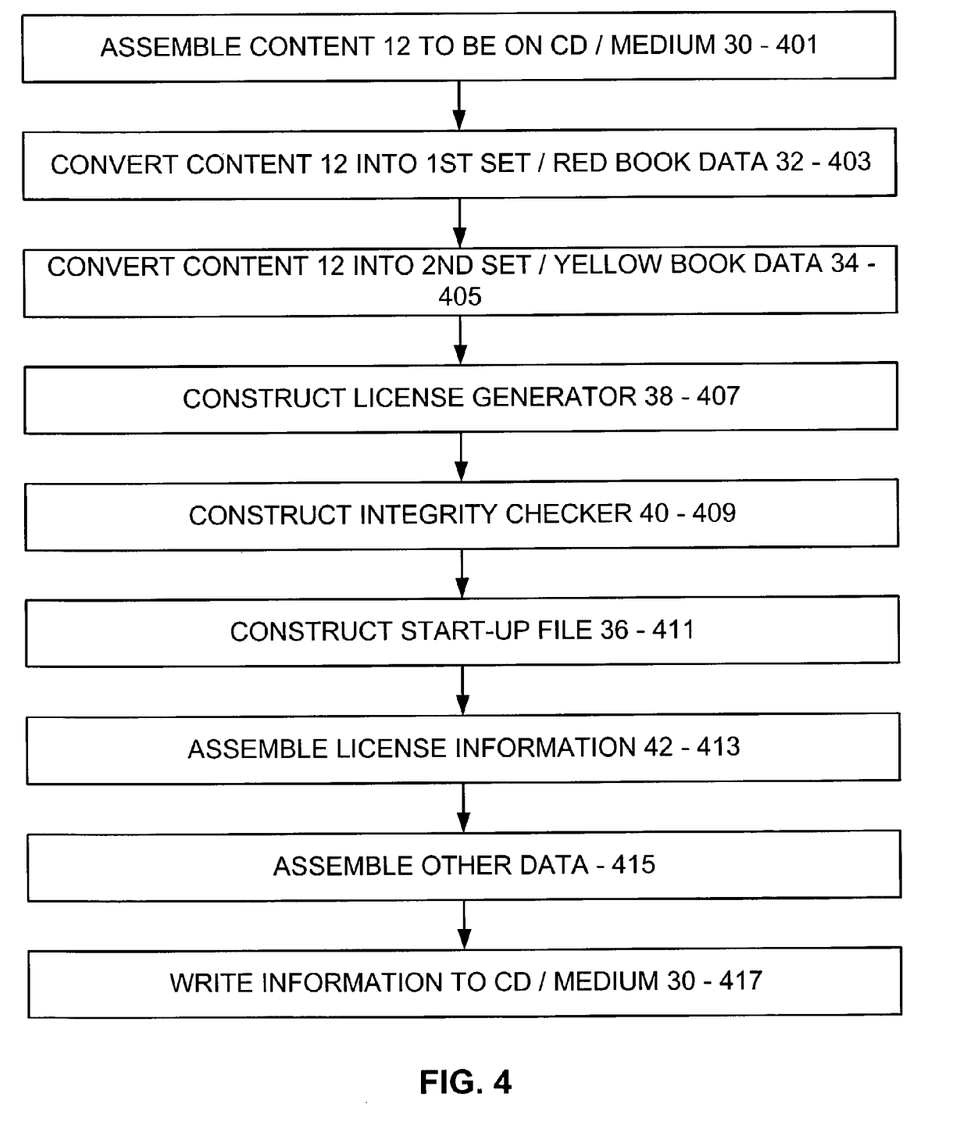
FIG. 4 is a flow diagram showing steps performed in manufacturing the medium of FIG. 3 including a license generator in accordance with one embodiment of the present invention.

In one embodiment of the present invention, and referring now to FIG. 4, a process for packaging the content 12 on the CD/medium 30 is as follows:

Preliminarily, the content 12 to be packaged on the CD 30 is assembled (step 401), and the content 12 is then prepared for recording on the CD 30. Typically, the CD 30 is recorded from an image file, although the CD 30 maybe recorded in any other appropriate manner. At least a portion of the assembled content 12 is to be recorded on the CD 30 as Red Book data and is therefore appropriately converted into such Red Book data 32 (step 403) and placed into the image file as such. Again, the Red Book data 32 in the image file and on the CD 30 is protected such that the computing device 14 cannot read same.

At least a portion of the assembled content 12 is to be recorded on the CD 30 as Yellow Book data 34 and is therefore appropriately converted into such Yellow Book data 34 (step 405) and placed into the image file as such. Significantly, and in one embodiment of the present invention, each piece of content 12 in the Yellow Book data format 32 is encrypted according to a content key (CK) to form (CK(content)) and such (CK(content)) is placed into the image file (step 405A). (CK) is typically a symmetric key, although (CK) may also be asymmetric without departing from the spirit and scope of he present invention. Note that every piece of the content 12 in the Yellow Book data format 32 may be encrypted according to the same content key (CK) or each piece may have a different (CK).

To decrypt a piece of the encrypted content 12 in the Yellow Book data 34, a user at a computing device 14 with a trusted component requires a corresponding license 16 having the content key (CK) therein, as was set forth above. Accordingly, in one embodiment of the present invention, a license generator 38 that issues the corresponding license 16 is constructed (step 407) and placed in to the image file. Presumably, the license generator 38 is part of the Yellow Book data 34, although the license generator 38 could also be part of another type of data on the CD 30 without departing from the spirit and scope of the present invention. Operation of the license generator 38 and therefore the structure thereof are set for the below in connection with reading and rendering the content 12. Within the bounds of the functions required to be performed by the license generator 38, the license generator 38 may have any appropriate structure and operation without departing from the spirit and scope of the present invention.

Note that in constructing the license generator 38, it may be desirable to individualize each license generator 38 per CD 30, per a number of CDs 30, or based on some other gradient. Accordingly, if the license generator 38 is somehow modified by a nefarious entity to issue a license 16 in a non-trustworthy manner, the modification should not be easily extended to other license generators 38 on other CDs 30. Individualizing a component such as a license generator 38 is known or should be apparent to the relevant public and therefore need not be discussed herein in any detail.

Ideally, a user of the CD 30 should not be able to make a copy or 'clone' of same and distribute the clone. Accordingly, in one embodiment of the present invention, an appropriate integrity checker 40 is constructed (step 409) and placed into the image file. Presumably, the integrity checker 40 is part of the Yellow Book data 34, although the integrity checker 40 could also be part of another type of data on the CD 30 without departing from the spirit and scope of the present invention. As maybe appreciated, the integrity checker 40 on the CD 30 when executed ensures that the CD 30 is not a clone. Typically, the integrity checker 40 operates by checking file sizes, hashes, and the like, and also checking for an identifier embedded in the CD 30 id present. An integrity checker 40 is known or should be apparent to the relevant public and therefore need not be described herein in any detail. Any appropriate integrity checker 40 may thus be employed without departing from the spirit and scope of the present invention.

As mentioned above, the CD 30 should include within the Yellow Book data 34 a start-up file 36 that is automatically read and executed when the CD 30 is inserted into the computing device 14. Typically, a computing device 14 automatically finds the start-up file 36 upon the CD 30 being inserted thereinto and then executes same. Notably, the start-up file 36 executes the license generator 38 and/or the integrity checker 40 as appropriate, and in fact may include the license generator 38 and/or the integrity checker 40 therein, or may be separate from the license generator 38 and/or the integrity checker 40. At any rate, an appropriate start-up file 36 is constructed (step 411) and placed into the image file.

To generate a license 16, the license generator 38 requires appropriate license-generating information 42, including the content key (CK) and any terms, conditions, rules, and/or requirements to be built into the license 16. Such license information 42 may specify a different (CK) for each piece of content 12 or a common (CK) for all of the content 12. Such license information 42 is thus assembled into an appropriate form (step 413) and placed into the image file. Notably, such information 42 may include sensitive data, such as for example (CK), and thus should be encrypted in a manner decryptable by the license generator 38. Also notably, such information 42 may be in the form of a database if appropriate, or may be compiled directly into the license generator 38 if appropriate.

Bearing in mind that the image file and the CD 30 has/will have the content 12 at least in the Yellow Book data format 34, it should be remembered that other data may also be packaged on the CD 30, where such other data is for some other purpose, or at least is not to be protected in accordance with the present invention. For example, such other data may be in the Red Book or Yellow Book data format 32, 34 or another format, and may or may not relate to the protected content 12. Particularly with regard to the present invention, such other data may include the start-up file 36 in the event that such start-up file 36 is separate from the license generator 38. At any rate, such other data is assembled into an appropriate form (step 415) and placed into the image file.

Once all information to be written to the CD 30 is collected and placed into an appropriate form, be it in an image file or otherwise, all the information is in fact written to the CD 30 (step 417) by appropriate writing technology. Such writing technology is known or should be apparent to the relevant public and therefore need not be discussed herein in any detail. Typically, multiple substantially identical copies of the CD 30 are produced, and such production may occur based on the image file if employed, based on a master CD 30, or both.

In one embodiment of the present invention, and referring now to FIG. 5, a process for reading and rendering the packaged content 12 from a CD/medium 30 is as follows:

Preliminarily, a user or the like appropriately inserts the CD 30 into the computing device 14 (step 501), and the computing device automatically performs an initial scan to detect directory and file information (step 503). During the scan, the computing device 14 finds the start-up file 36 and executes same (step 505). As may be appreciated, in performing steps 503 and 505, the computing device 14 automatically is directed to the Yellow Book data 34 on the CD 30.

In one embodiment of the present invention, execution of the start-up file 36 in turn executes the integrity checker 40 located on the CD 30 (step 507). As set forth above, integrity checker 40 when executed closely examines the CD 30 to ensure that such CD 30 is an original production disc, and not some form of clone or copy or a memory or disc image. If the integrity checker 40 pronounces the CD 30 to be an original, processing continues. Otherwise, processing halts.

Presuming that the integrity checker 40 pronounces the CD 30 to be an original, the start-up file 36 next executes the license generator 38 located on the CD 30 (step 509), and the license generator 38 generates for the computing device 14 a license 16 corresponding to each of one or more pieces of content 12 in the Yellow Book data 34 (step 511). Note that the license generator 38 may generate a license 16 for each piece of content 12 in the Yellow Book data 34 or for only select ones of such pieces of content 12.

Figure 5:
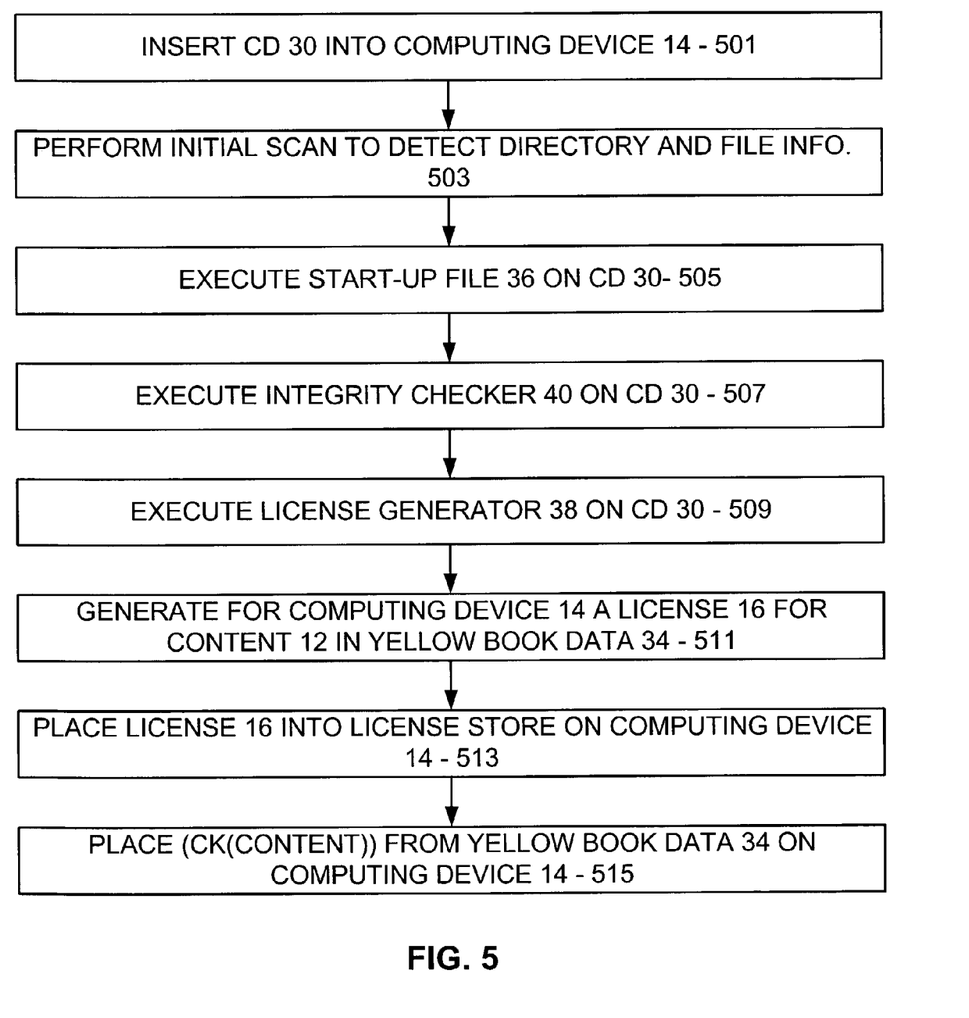
FIGS. 5 and 5A are flow diagrams showing steps performed by the license generator of FIG. 4 and the trusted component of FIG. 2 in generating a license for rendering content on the medium of FIG. 3 on the computing device of FIG. 2 in accordance with one embodiment of the present invention.
Figure 5A:
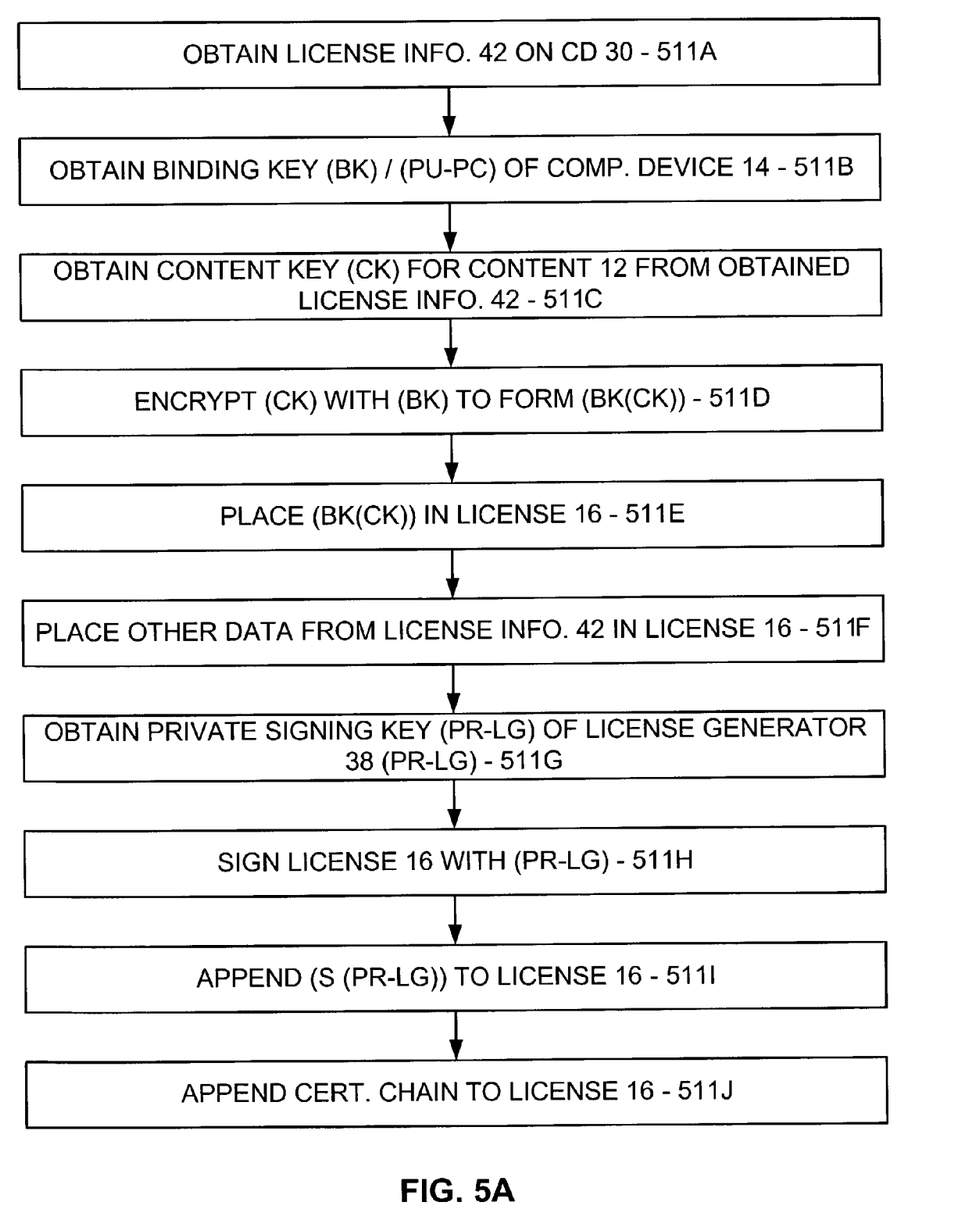

In particular, and turning now to FIG. 5A, the license generator obtains the license information 42 from the CD 30 and decrypts same if necessary (step 511A). Typically, each protected piece of content 12 (each song, e.g.) is a file and requires a corresponding license 16. Also typically, the license information 42 includes one record for each license 16 to be created. Each record of the license information 42 thus typically includes an identifier of the corresponding piece of content 12, the content key (CK) that decrypts such content 12 (i.e., (CK(content))), and rights/requirements/conditions/etc. to be placed in the license 16 for such content 12. In addition, each record may have absolute or relative expiration data, a required application security level, and other similar information.

To generate a license 16 corresponding to a particular piece of content 12 on the CD 30, the license generator 38 works with the trusted component 18 of the computing device 14 and obtains a binding key (BK) of the computing device 14 (PU-PC) from such trusted component 18 (step 511B). Note that (BK) is typically a public key of the computing device 14 (PU-PC), although (BK) may also be another key such as a symmetric key. Typically, (BK) is provided in the form of a certificate, although the use of such a certificate is not believed necessary in all circumstances. At any rate, the license generator obtains the content key (CK) for the particular piece of content 12 from the obtained license information 42 (step 511C), encrypts (CK) with (BK) to form (BK(CK)) (step 511D) and places same in the license 16 being generated (step 511E). Notably, the trusted component 18 can later access (CK) from (BK(CK)) in the license 16 and apply such accessed (CK) to (CK(content)) to reveal the corresponding content 12.

The license generator 38 also places in the license 16 being generated for the content 12 at least a portion of the remainder of the record of license information 42 corresponding to the content 12 (step 511F). Thus, the license 16 as generated may include (BK(CK)), an identifier of the corresponding piece of content 12, the rights granted by the license and any terms/requirements/conditions/etc. that must be satisfied for the corresponding content 12 to be rendered, any expiration data, any required application security level, and/or any other information.

The license 16 may include a signature to allow the trusted component 18 to verify same. If so, the license generator 38, which has a private signing key (PR-LG) embedded therein, obtains such (PR-LG) (step 511G), signs the license 16 being generated with same (step 511H) to produce a signature (S (PR-LG)), and appends (S (PR-LG)) to the license 16 being generated (511I). Typically, the public key (PU-LG) corresponding to (PR-LG) is derived by way of a chain of certificates from a root signing key, and the chain of certificates is also appended to the license 16 being generated (511J). Accordingly, and as is known, the trusted authority 18 can verify (S (PR-LG)) by way of obtaining (PU-LG) based on the chain of certificates and knowledge of the root signing key. Thus, a license with a (S (PR-LG)) that verifies will be recognized by the trusted component 18 to be a valid and authentic license 16.

Figure 6:
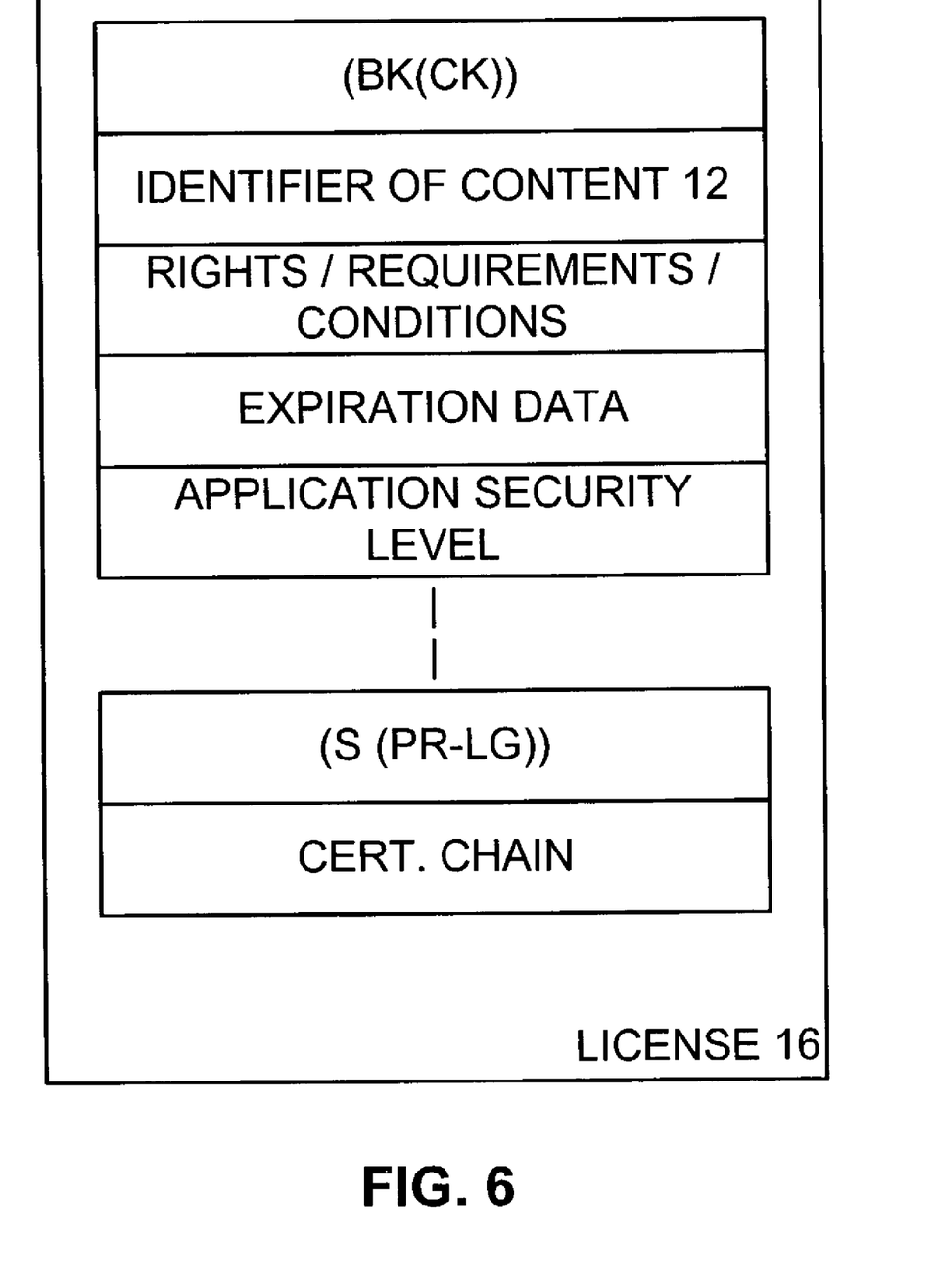
FIG. 6 is a block diagram showing the license resulting from the steps performed in FIGS. 5 and 5A in accordance with one embodiment of the present invention.

A license 16 as generated by the license generator 38 for the computing device 14 is shown in FIG. 6. Once generated, and referring again to FIG. 5, the license 16 is placed into a license store on the computing device 14 and accessible to the trusted component 18 (step 513). Additionally, the corresponding piece of content 12 in encrypted form (i.e., (CK(content))) from the Yellow Book data 34 is transferred from the CD 30 to a memory of the computing device 14 (step 515). Accordingly, the piece of content 12 on the computing device 14 may now be rendered thereon according to the terms of the corresponding license 16 on the computing device 14 as determined by the trusted component 18 of such computing device 14.

Generally, upon a request to render the encrypted content 12 on the computing the device 14 in a particular manner (i.e., printing, reading, editing, etc.), the trusted component 18 thereon:

retrieves the corresponding license 16 from the license store, verifies the signature of the license 16 (S (PR-LG)), determines based on the rights conferred by the license 16 and the terms/requirements/conditions/etc. in the license 16 whether rendering should be permitted in the manner sought, and determines based on any expiration data, any required application security level, and/or any other information whether rendering should be permitted.

Assuming rendering is to be permitted, the trusted component 18 then:

retrieves (BK(CK)) from the license 16, obtains a decrypting key such as (BK) if (BK) is a symmetric key or a private key of the computing device 14 (PR-PC) corresponding to (PU-PC) if (BK) is such (PU-PC), applies the decrypting key to (BK(CK)) to result in (CK), retrieves the encrypted content 12 (CK(content)), and applies (CK) to (CK(content)) to result in the content 12 in a decrypted form.

Such decrypted content 12 may then be rendered by an appropriate rendering application. Note that the CD 30 need not necessarily be present in the computing device 14 to render the content 12 therefrom, inasmuch as the content 12 was copied from such CD 30. Nevertheless, the content 12 may be rendered directly from the CD 30 without departing from the spirit and scope of the present invention.

Significantly, although the content 12 has been copied from the CD 30 to the computing device 14, such content 12 is in an encrypted form that may only be decrypted by the trusted component 18 of the computing device 14. Accordingly, if a user were to transmit the copied encrypted content 12 and the license 16 therefor to another computing device 14, the encrypted content 12 could not be decrypted on the copied-to computing device 14 since the content 12 is bound to the original computing device 14. In particular, only the trusted component 18 of the original computing device 14 would have access to the decrypting key necessary to decrypt (BK(CK)) from the license 16, and the trusted component 18 of the copied-to computing device 14 would not have access to such decrypting key.

In one embodiment of the present invention, the trusted component 18 is constructed to work with an inserted CD 30 by, for example, remembering whether the content 12 on the CD 30 has already been licensed to the computing device 14. If so, the license generator 38 need not be executed. Conversely, the trusted component 18 may run the license generator 28 if content 12 on the CD 30 has not already been licensed. Other functions performed by the trusted component 18 might include but are not limited to: tracking the age of each CD-based license 16, and displaying for each license 16 a list of current rights and perhaps a cost to upgrade to a higher-value products available from a site such as a network site. As should be appreciated, the trusted component 18 could thus be integrated into the 'ripping' environment.

It is to be appreciated that absent any counter-feature, content 12 from a particular physical CD 30 could be licensed from the CD 30 to each of several computing devices merely by inserting the CD 30 into each of such computing devices 14 and allowing the steps of FIG. 5 to occur. Nevertheless, such situation is deemed acceptable inasmuch as the physical CD 30 likely can be transported among and 'ripped' to only a limited number of computing devices 14 in a reasonable amount of time.

A relatively effective counter-feature to mitigate such situation may be for the license generator 38 to issue temporally limited licenses 16, say on the order of two weeks or thirty days, and/or play-count limited licenses 16, say on the order of 20 or 30 renderings of the corresponding content 12. With such counter-feature, the physical CD 30 is required to be re-inserted to re-license a computing device 14 after a license 16 expires or runs out. Thus, the physical CD 30 could not be discarded or handed off once ripping takes place if ripped content 12 is to maintain viability.

In one embodiment of the present invention, the encrypted content 12 and/or the license 16 generated therefor includes licensing information such as a network site at which a higher-value license 16 can be obtained. Thus, if content 12 is ripped from a CD 30 with a limited license 16, the limited license 16 could be replaced or otherwise substituted by the higher-value license 16. Significantly, such a situation converts the threat of unfettered ripping into an opportunity to generate income for an owner of the content 12. Similarly, the encrypted content 12 and/or the license 16 generated therefor can include advertisements, which also can generate income for the owner of the content 12.

In one embodiment of the present invention, a plurality of licenses 16 is available to be generated by the license generator 38 for each piece of content 12. Such licenses may include but are not limited to: device-specific licenses 16, operating system-specific license 16, rights-specific licenses 16, etc.

CONCLUSION

The programming necessary to effectuate the processes performed in connection with the present invention is relatively straight-forward and should be apparent to the relevant programming public. Accordingly, such programming is not attached hereto. Any particular programming, then, may be employed to effectuate the present invention without departing from the spirit and scope thereof.

In the foregoing description, it can be seen that the present invention comprises a new and useful method and mechanism whereby a medium 30 such as a CD or the like is copy-protected so as to prevent unfettered distribution of the content 12 thereon, while still allowing copying of the content 12 to a computing device 14 or the like. A license generator 38 on the CD 30 requires that the content be copied in a copy-protected format accessible only by way of a corresponding digital license 16, and generates the license 16 in combination with the trusted component 18 on the computing device 14.

It should be appreciated that changes could be made to the embodiments described above without departing from the inventive concepts thereof. Most importantly, the present invention may be employed in connection with any trust-based system, and not merely with a DRM system 10, may be applied to any medium 30, and not merely a CD, and may be employed in connection with any data format 32, 34, and not merely Red Book or Yellow Book data. It should be understood, therefore, that this invention is not limited to the particular embodiments disclosed, but it is intended to cover modifications within the spirit and scope of the present invention as defined by the appended claims.

The invention claimed is:

1. A method for packaging digital content on a digital storage medium, the method comprising:

placing the content on the medium, the content being encrypted according to a content key (CK) to form (CK(content));

placing a license generator on the medium, the license generator for generating for a particular entity a digital license corresponding to the placed content, the generated license from the license generator including the content key (CK) therein encrypted in a form decryptable by the particular entity, the generated license from the license generator also including rules that the particular entity must follow in order to decrypt the encrypted content key (CK) and apply the decrypted content key (CK) to (CK(content)) so as to reveal the content, the license generator having embedded therein a private key for signing the digital license;

placing a start-up file on the medium, the start-up file being read and executed when the medium is mounted to a computing device, the executed start-up file executing the license generator; and placing license-generating information on the medium, the license generating information including the content key (CK) and the rules to be included in the license.

2. The method of claim 1 comprising storing the content on the medium in a Yellow Book format.

3. The method of claim 1 comprising placing the content on the medium in a pre-determined format and further comprising placing the content on the medium in another pre-determined format.

4. The method of claim 3 comprising placing the content on the medium in a Yellow Book format and in a Red Book format.

5. The method of claim 3 further comprising protecting the content on the medium in the another format such that the computing device cannot render same.

6. The method of claim 1 further comprising individualizing the license generator with respect to the placed-on medium.

7. The method of claim 1 further comprising placing an integrity checker on the medium, the integrity checker on the medium when executed for determining whether the medium is an original or a copy of an original.

8. The method of claim 7 comprising placing the start-up file on the medium, the executed start-up file executing the integrity checker.

9. The method of claim 1 comprising placing audio content on the medium.

10. The method of claim 9 comprising placing the audio content on a compact disc (CD).

11. The method of claim 1 comprising placing each item in an image file and writing the image file to the medium.

12. A digital storage medium having stored thereon:
a piece of digital content encrypted according to a content key (CK) to form (CK(content));
a license generator for generating for a particular entity a digital license corresponding to the content, the generated license from the license generator including the content key (CK) therein encrypted in a form decryptable by the particular entity, the generated license from the license generator also including rules that the particular entity must follow in order to decrypt the encrypted content key (CK) and apply the decrypted content key to CK content)) so as to reveal the content, the license generator having embedded therein a private key for signing the digital license;
a start-up file read and executed when the medium is mounted to a computing device, the executed start-up file executing the license generator; and
license generating information including the content key (CK) and the rules to be included in the license.

13. The medium of claim 12 having stored thereon the content stored in a Yellow Book format.

14. The medium of claim 12 having stored thereon the content stored in a pre-determined format and further comprising the content stored in another pre-determined format.

15. The medium of claim 14 having stored thereon the content stored in a Yellow Book format and in a Red Book format.

16. The medium of claim 14 having stored thereon the content stored in the another format such that the computing device cannot render same.

17. The medium of claim 12 having stored thereon the license generator individualized with respect to the medium.

18. The medium of claim 12 further having stored thereon an integrity checker which when executed determines whether the medium is an original or a copy of an original.

19. The medium of claim 18 having stored thereon the start-up file which when executed executes the integrity checker.

20. The medium of claim 12 having stored thereon audio content.

21. The medium of claim 20 comprising a compact disc (CD).

22. A method for generating a license for a computing device for a piece of digital content stored on a digital storage medium, the content being encrypted according to a content key (CK) to form (CK(content)), the method comprising:
mounting the medium to the computing device;
performing, by the computing device, an initial scan to detect a start-up file on the medium;
executing, by the computing device, the detected start-up file;
executing, by the start-up file, a license generator on the medium;
obtaining, by the license generator, license-generating information on the medium including the content key (CK) and rules for rendering the content, the license generator having embedded therein a private key for signing a digital license;
generating, by the license generator, for the computing device, a digital license corresponding to the content on the medium, the generated license from the license generator including having the content key (CK) encrypted in a form decryptable by the computing device and the rules for rendering the content as specified by the obtained license-generating information; and
placing the generated license on the computing device, whereby the content may be rendered by retrieving the license, determining based on the rules in the license whether rendering is permitted, and if rendering is in fact permitted retrieving the encrypted (CK) from the license and decrypting same, obtaining (CK(content)), applying (CK) to (CK(content)) to result in the content in a decrypted form, and rendering the decrypted content.

23. The method of claim 22 further comprising copying (CK(content)) from the medium to the computing device.

24. The method of claim 23 comprising copying (CK(content)) from a Yellow Book portion of the medium to the computing device.

25. The method of claim 23 wherein the medium also has stored thereon the content in an unencrypted form, the method further comprising preventing copying of the unencrypted content from the medium.

26. The method of claim 25 comprising preventing copying of the unencrypted content from a Red Book portion of the medium.

27. The method of claim 22 wherein the medium further has stored thereon an integrity checker, the method further comprising executing, by the executed start-up file, the integrity checker, determining, by the integrity checker, whether the medium is an original or a copy of an original, and halting processing if the medium is a copy.

28. The method of claim 22 wherein generating the digital license comprises:
  signing the license based on a private key of the license generator (PR-LG) to produce a signature (S (PR-LG)), a public key (PU-LG) corresponding to (PR-LG) being derivable by way of a chain of certificates from a root signing key;
  appending (S (PR-LG)) to the license; and
  appending the chain of certificates to the license, whereby the content may be rendered by deriving (PU-LG) from the chain of certificates and knowledge of the root signing key, obtaining (S (PR-LG)) from the license and verifying same based on the derived (PU-LG), and proceeding if in fact (S (PR-LG)) verifies.

29. The method of claim 22 wherein generating the digital license comprises:
  obtaining a binding key (BK) of the computing device from a trusted component thereof;
  obtaining the content key (CK) from the obtained license-generating information;
  encrypting (CK) with (BK) to form (BK(CK)) and placing same in the license, whereby the content may be rendered by retrieving (BK(CK)) from the license, obtaining a decrypting key corresponding to (BK), applying the decrypting key to (BK(CK)) to result in (CK), retrieving (CK(content)), and applying (CK) to (CK(content)) to result in the content in a decrypted form.

30. The method of claim 29 comprising obtaining a binding key (BK) comprising a public key of the computing device (PU-PC), whereby the decrypting key is a private key of the computing device (PR-PC) corresponding to (PU-PC).

31. A method for packaging digital content on a digital storage medium, the method comprising:
  placing the content on the medium in a Yellow Book format, the Yellow Book content being encrypted according to a content key (CK) to form (CK(content)), the Yellow Book content once decrypted being renderable by a computing device;
  placing the content on the medium in a Red Book format, the Red Book content being protected such that the Red Book content is non-renderable by the computing device;
  placing a license generator on the medium, the license generator for generating for a particular entity a digital license corresponding to the placed Yellow Book content, the generated license from the license generator including the content key (CK) therein encrypted in a form decryptable by the particular entity, the generated license from the license generator also including rules that the particular entity must follow in order to decrypt the encrypted content key (CK) and apply the decrypted content key (CK) to (CK(content)) so as to reveal the content, the license generator having embedded therein a private key for signing the digital license;
  placing a start-up file on the medium, the start-up file being read and executed when the medium is mounted to the computing device, the executed start-up file executing the license generator; and
  placing license-generating information on the medium, the license generating information including the content key (CK) and the rules to be included in the license.

32. The method of claim 31 further comprising placing an integrity checker on the medium, the integrity checker on the medium when executed for determining whether the medium is an original or a copy of an original.

33. The method of claim 32 comprising placing the start-up file on the medium, the executed start-up file executing the integrity checker.

34. The method of claim 31 comprising placing audio content on the medium.

35. The method of claim 34 comprising placing the audio content on a compact disc (CD).

36. The method of claim 31 comprising placing each item in an image file and writing the image file to the medium.

37. A digital storage medium having stored thereon:
  a piece of digital content encrypted according to a content key (CK) to form (CK(content)) and placed on the medium in a Yellow Book format, the Yellow Book content once decrypted being renderable by a computing device;
  the piece of digital content placed on the medium in a Red Book format, the Red Book content being protected such that the Red Book content is non-renderable by the computing device;
  a license generator for generating for a particular entity a digital license corresponding to the Yellow Book content, the generated license from the license generator including the content key (CK) therein encrypted in a form decryptable by the particular entity, the generated license from the license generator also including rules that the particular entity must follow in order to decrypt the encrypted content key (CK) and apply the decrypted content key (CK) to (CK(content)) so as to reveal the content, the license generator having embedded therein a private key for signing the digital license;
  a start-up file read and executed when the medium is mounted to a computing device, the executed start-up file executing the license generator; and
  license generating information including the content key (CK) and the rules to be included in the license.

38. The medium of claim 37 further having stored thereon an integrity checker which when executed determines whether the medium is an original or a copy of an original.

39. The medium of claim 38 having stored thereon the start-up file which when executed executes the integrity checker.

40. The medium of claim 37 having stored thereon audio content.

41. The medium of claim 40 comprising a compact disc (CD).

* * * * *